(12) United States Patent
Huang et al.

(10) Patent No.: US 10,662,912 B2
(45) Date of Patent: May 26, 2020

(54) FUEL PRESSURE REGULATOR AND FUEL FILTER ASSEMBLY

(71) Applicant: CPT GROUP GmbH, Hannover (DE)

(72) Inventors: Yonglin Huang, Wuhu (CN); Dong Su, Wuhu (CN); Dieter Hagist, Lahnstein (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/340,362

(22) PCT Filed: Oct. 9, 2017

(86) PCT No.: PCT/EP2017/075650
§ 371 (c)(1),
(2) Date: Apr. 8, 2019

(87) PCT Pub. No.: WO2018/069233
PCT Pub. Date: Apr. 19, 2018

(65) Prior Publication Data
US 2019/0242342 A1    Aug. 8, 2019

(30) Foreign Application Priority Data
Oct. 11, 2016  (CN) ...................... 2016 2 1113526 U

(51) Int. Cl.
*F02M 37/46* (2019.01)
*F02M 37/22* (2019.01)
(Continued)

(52) U.S. Cl.
CPC ........... *F02M 37/46* (2019.01); *B01D 29/114* (2013.01); *B01D 35/005* (2013.01);
(Continued)

(58) Field of Classification Search
CPC .......... B01D 2201/30; B01D 2201/342; B01D 2201/50; B01D 29/114; B01D 35/005;
(Continued)

(56) References Cited

U.S. PATENT DOCUMENTS

| 4,011,848 | A |   | 3/1977  | Coddington |            |
|-----------|---|---|---------|------------|------------|
| 6,142,126 | A | * | 11/2000 | Kanamaru   | B01D 35/0273 |
|           |   |   |         |            | 123/509    |
| 2015/0014941 | A1 | * | 1/2015 | Yanagiguchi | F16J 15/3212 |
|           |   |   |         |            | 277/549    |

FOREIGN PATENT DOCUMENTS

| DE | 197 11 531 | 12/1997 |
| DE | 100 19 784 | 10/2001 |
| EP | 0 863 304  | 9/1998  |

(Continued)

OTHER PUBLICATIONS

International Search Report issued in corresponding PCT application No. PCT/EP2017/075650.
(Continued)

*Primary Examiner* — Terry K Cecil
(74) *Attorney, Agent, or Firm* — Cozen O'Connor

(57) ABSTRACT

A fuel pressure regulator and fuel filter assembly includes: a housing, having a connecting end having a fuel channel; a filter element, located in an accommodating cavity of the housing; a cover plate, located at a second end of the housing; a rear cover, having one end being an opening end and another end being a spring seat, and a sidewall, the opening end being connected to the housing; a spring, a first end thereof being pressed against the spring seat; a seal arranged in the rear cover, a second end of the spring being pressed against the seal; and a fixing ring that fixes the rear cover to the connecting end of the housing, the fixing ring being welded by laser to the connecting end. When fuel pressure is no greater than a spring preload, the seal closes the fuel channel.

8 Claims, 3 Drawing Sheets

(51) Int. Cl.
   *B01D 29/11* (2006.01)
   *B01D 35/00* (2006.01)
   *B01D 35/147* (2006.01)
   *B01D 35/30* (2006.01)
   *F16B 5/08* (2006.01)
   *F16J 15/3212* (2016.01)
   *H05F 3/00* (2006.01)

(52) U.S. Cl.
   CPC ......... *B01D 35/1475* (2013.01); *B01D 35/30* (2013.01); *F02M 37/22* (2013.01); *F16B 5/08* (2013.01); *F16J 15/3212* (2013.01); *B01D 2201/30* (2013.01); *B01D 2201/342* (2013.01); *B01D 2201/50* (2013.01); *H05F 3/00* (2013.01)

(58) Field of Classification Search
   CPC .... B01D 35/1475; B01D 35/30; F02M 37/22; F02M 37/46; F16B 5/08; F16J 15/3212; H05F 3/00
   See application file for complete search history.

(56) References Cited

FOREIGN PATENT DOCUMENTS

EP          1 398 495         3/2004

OTHER PUBLICATIONS

Written Opinion issued in corresponding PCT application No. PCT/EP2017/075650.

* cited by examiner

FUEL PRESSURE REGULATOR AND FUEL FILTER ASSEMBLY

CROSS REFERENCE TO RELATED APPLICATIONS

This is a U.S. national stage of application No. PCT/EP2017/075650, filed on Oct. 9, 2017, which claims priority to Chinese Application No. 201621113526.1, filed Oct. 11, 2016, the content of each of which is incorporated herein by reference.

FIELD OF THE INVENTION

The present device relates to a vehicle fuel system, in particular an assembly comprising a fuel pressure regulator and a fuel filter.

DESCRIPTION OF THE PRIOR ART

In the current market, a fuel pressure regulator and a fuel filter are generally integrated together by secondary injection molding, wherein the fuel pressure regulator comprises a body, a rear cover that fits the body, a valve seat, a spring, a diaphragm, a seal and an O-ring, wherein the valve seat has an accommodating cavity and a through-hole running through the accommodating cavity, the spring is disposed in the accommodating cavity with one end pressed against the valve seat and another end fixed to the rear cover, the diaphragm is located between the body and the valve seat and is welded to the body and the valve seat, an opening aligned with the through-hole of the valve seat is provided in the diaphragm in a middle position, the seal is fixed to the body, and the seal cooperates with an opening of the valve seat. When fuel pressure is higher than a standard value, high-pressure fuel will push the valve seat via the diaphragm, the spring will be compressed, and fuel will return to a fuel storage box of a fuel pump via the through-hole of the valve seat and an opening in the rear cover. When fuel pressure is lower than a standard value, the spring pushes against and holds the valve seat in place, the valve seat and the seal cooperate to form a seal, and fuel return stops. The O-ring is located in a groove on the outermost side of the body, and is used to form a seal with an injection molded housing.

However, the problem of fuel leakage still occurs often at the joint between the housing formed by secondary injection molding and the fuel pressure regulator; moreover, the fuel pressure regulator has a complex structure and a high cost.

SUMMARY OF THE INVENTION

An object of the present device is to provide a fuel pressure regulator and fuel filter assembly, which has a simple structure and a low cost, and solves the problem of fuel leakage.

In accordance with a first aspect of the present invention, a fuel pressure regulator and fuel filter assembly provided in the present device comprises: a housing, having an accommodating cavity and a connecting end, the connecting end having a fuel channel in communication with the accommodating cavity; a filter element, located in the accommodating cavity of the housing; a cover plate, located at one end of the housing, the cover plate being provided with a fuel inlet and a fuel outlet; a rear cover, being hollow inside, with one end being an opening end and another end being a spring seat, and an opening being provided in a sidewall of the rear cover, the opening end of the rear cover being connected to the connecting end of the housing; a spring, being located in the rear cover, a first end of the spring being pressed against the spring seat of the rear cover; a seal, being located in the rear cover, with a second end of the spring being pressed against the seal, wherein when fuel pressure in the housing is no greater than a spring preload, the seal is pressed tightly against the connecting end of the housing and closes the fuel channel; and a fixing ring, which fits the rear cover to fix the rear cover to the connecting end of the housing, the fixing ring being welded by laser to the connecting end.

Preferably, the connecting end of the housing has an end wall, a sealing part protruding from the end wall, and a welding part; the fuel channel runs through the sealing part, the opening end of the rear cover is located outside the sealing part, and the opening end has a bent part formed by outward bending; the fixing ring is located outside the rear cover and presses against the bent part, and the fixing ring is connected by laser welding to the welding part.

Preferably, the welding part is disposed around the outside of the sealing part and is separated from the sealing part by a certain gap, and the fixing ring has an inner ring part and an outer ring part which are spaced apart; the inner ring part and the opening end of the rear cover are located between the sealing part and the welding part; the welding part is located between the inner ring part and the outer ring part, and is welded by laser to the outer ring part.

Preferably, the sealing part has a sealing face; when fuel pressure in the housing is no greater than the spring preload, the seal is pressed tightly against the sealing face and thereby closes the fuel channel.

Preferably, the seal is fluororubber, with a metal framework injection molded therein.

Preferably, a grounding bolt and a grounding spring are disposed in the cover plate.

Compared with the prior art, since the rear cover, and the spring and seal located in the rear cover, cooperate with the connecting end of the housing to achieve regulation of fuel pressure at one end of the assembly, the structure according to an aspect of the present invention is simple and the cost is low. Moreover, the fixing ring is welded by laser to the connecting end of the housing so as to fix the rear cover to the housing; requiring no secondary injection molding, and fuel leakage is avoided.

BRIEF DESCRIPTION OF THE DRAWINGS

The accompanying drawings, which form part of the present application, are intended to furnish deeper understanding of the present device. Schematic embodiments of the present device, and descriptions thereof, are intended to explain the present device, and do not constitute an improper limitation thereof. In the drawings.

DETAILED DESCRIPTION OF THE PRESENTLY PREFERRED EMBODIMENTS

Figure 1:
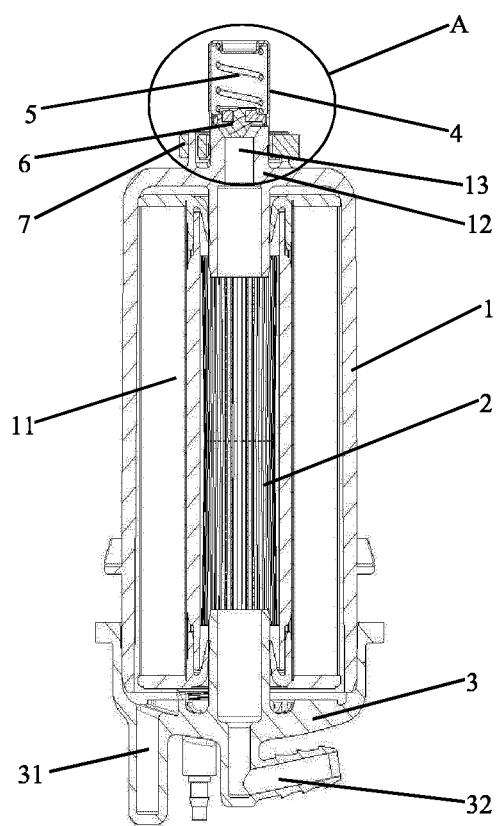
FIG. 1 is a sectional view of the fuel pressure regulator and fuel filter assembly.

Referring to FIG. 1, the fuel pressure regulator and fuel filter assembly of the present device comprises a housing 1, a filter element 2, a cover plate 3, a rear cover 4, a spring 5, a seal 6 and a fixing ring 7. The housing 1 has an accommodating cavity 11 and a connecting end 12, the connecting end 12 having a fuel channel 13 in communication with the accommodating cavity 11. The filter element 2 is located in the accommodating cavity 11 of the housing 1. The cover plate 3 is located at one end of the housing 1, and is provided with a fuel inlet 31 and a fuel outlet 32.

Figure 2:
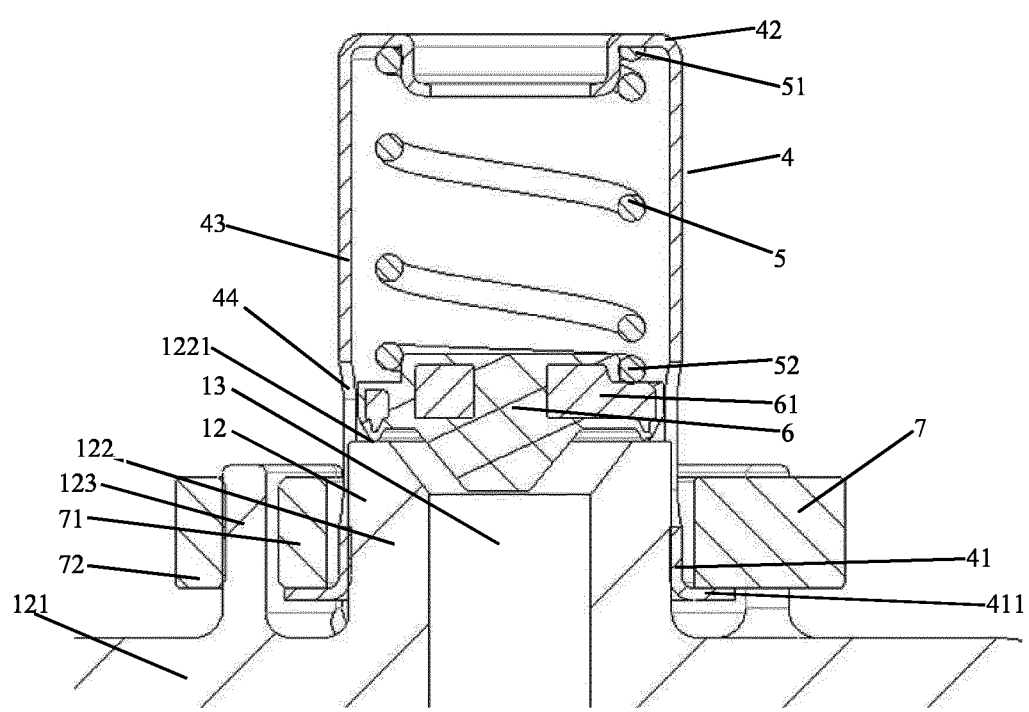
FIG. 2 is an enlarged view of region A in FIG. 1.
Figure 3:
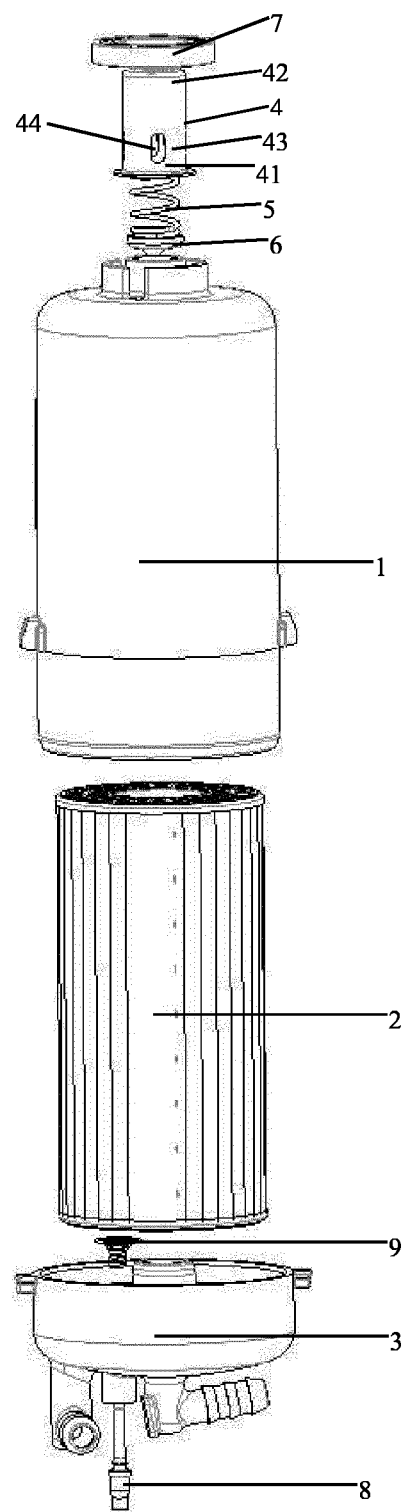
FIG. 3 is an exploded view of the fuel pressure regulator and fuel filter assembly.

Referring to FIGS. 2 and 3, the rear cover 4 is hollow inside; one end thereof is an opening end 41, the other end being a spring seat 42, and an opening 44 is provided on a sidewall 43 of the rear cover 4; the opening end 41 of the rear cover 4 is connected to the connecting end 12 of the housing 1. The spring 5 is located in the rear cover 4, and a first end 51 of the spring 5 is fixed to the spring seat 42 of the rear cover 4. The seal 6 is located in the rear cover 4, and a second end 52 of the spring 5 is pressed against the seal 6; when fuel pressure in the housing 1 is no greater than a spring preload, the seal 6 is pressed tightly against the connecting end 12 of the housing 1 and closes the fuel channel, but when fuel pressure in the housing is greater than the spring preload, fuel will push the seal 6, so that a gap forms between the seal 6 and the connecting end 12, and surplus fuel will return to a fuel storage box of a fuel pump directly via the opening 44 in the sidewall 43 of the rear cover 4. The fixing ring 7 fits the rear cover 4 to fix the rear cover 4 to the connecting end 12 of the housing 1, and the fixing ring 7 is welded by laser to the connecting end 12. Since the rear cover 4, and the spring 5 and seal 6 located in the rear cover 4, cooperate with the connecting end 12 of the housing 1 to achieve regulation of fuel pressure at one end of the assembly, the structure is simple and the cost is low; moreover, the fixing ring 7 is welded by laser to the connecting end 12 of the housing 1 so as to fix the rear cover 4 to the housing 1, there is no secondary injection molding, and fuel leakage is avoided.

The connecting end 12 of the housing 1 has an end wall 121, a sealing part 122 protruding from the end wall 121, and a welding part 123. The fuel channel 13 runs through the sealing part 122, the opening end 41 of the rear cover 4 is located outside the sealing part 122, and the opening end 41 has a bent part 411 formed by outward bending. The fixing ring 7 is located outside the rear cover 4 and presses against the bent part 411, and the fixing ring 7 is connected by laser welding to the welding part 123.

The welding part 123 is disposed around the outside of the sealing part 122 and is separated from the sealing part 122 by a certain gap, and the fixing ring 7 has an inner ring part 71 and an outer ring part 72 which are spaced apart. The inner ring part 71 and the opening end 41 of the rear cover 4 are located between the sealing part 122 and the welding part 123. The welding part 123 is located between the inner ring part 71 and the outer ring part 72, and is welded by laser to the outer ring part 72.

The sealing part 122 has a sealing face 1221. When fuel pressure in the housing 1 is no greater than the spring preload, the seal 6 is pressed tightly against the sealing face 1221 and thereby closes the fuel channel 13. When fuel pressure in the housing is greater than the spring preload, fuel pushes the seal 6 upwards by a certain distance, and a certain gap forms between the seal 6 and the sealing face 1221; fuel flows through the gap, and returns to the fuel storage box of the fuel pump through the opening 44 in the sidewall 43 of the rear cover 4.

The seal 6 is fluororubber, with a metal framework 61 injection molded therein, to guarantee strength requirements of the seal 6.

A grounding bolt 8 and a grounding spring 9 are disposed in the cover plate 3, and are configured to eliminate static electricity.

Although the present device has been disclosed above by preferred embodiments, it is not limited to these. Changes and amendments of all kinds made within the spirit and scope of the present device by any person skilled in the art shall be included in the scope of protection of the present device. Thus the scope of protection of the present device shall be the scope defined by the claims.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel pressure regulator and fuel filter assembly, comprising:
   a housing, the housing having an accommodating cavity and a connecting end, the connecting end having a fuel channel in communication with the accommodating cavity, the connecting end comprising an end wall, a sealing part protruding from the end wall, and a welding part disposed around an outside of the sealing part so that a gap is formed between the sealing part and the end wall;
   a filter element, located in the accommodating cavity of the housing;
   a cover plate, located at a second end of the housing, opposite the connecting end of the housing, the cover plate comprising a fuel inlet and a fuel outlet;
   a hollow rear cover, having a first rear cover end configured as an opening end, and second rear cover end configured as a spring seat, the rear cover having a sidewall having a sidewall opening, the opening end of the rear cover being connected to the connecting end of the housing;
   a spring, having a first spring end and a second spring end, the spring being arranged in the rear cover such that the first spring end is pressed against the spring seat of the rear cover;
   a seal, being located in the rear cover and arranged such that the second spring end is pressed against the seal, wherein when fuel pressure in the housing is no greater than a spring preload, the seal is pressed tightly against the connecting end of the housing and closes the fuel channel; and
   a fixing ring, arranged in relation to the rear cover so as to fix the rear cover to the connecting end of the housing, the fixing ring having an inner ring part and an outer ring part spaced apart from one another, the outer ring part of the fixing ring being welded to the welding part of the connecting end, and the inner ring part of the fixing ring being arranged in the gap between the sealing part and the end wall.

2. The fuel pressure regulator and fuel filter assembly as claimed in claim 1, wherein the seal is made of fluororubber, with a metal framework injection molded therein.

3. The fuel pressure regulator and fuel filter assembly as claimed in claim 1, further comprising a grounding bolt and a grounding spring arranged in the cover plate.

4. A fuel pressure regulator and fuel filter assembly, comprising:
- a housing, the housing having an accommodating cavity and a connecting end, the connecting end having a fuel channel in communication with the accommodating cavity;
- a filter element, located in the accommodating cavity of the housing;
- a cover plate, located at a second end of the housing, opposite the connecting end of the housing, the cover plate comprising a fuel inlet and a fuel outlet;
- a hollow rear cover, having a first rear cover end configured as an opening end, and second rear cover end configured as a spring seat, the rear cover having a sidewall having a sidewall opening, the opening end of the rear cover being connected to the connecting end of the housing;
- a spring, having a first spring end and a second spring end, the spring being arranged in the rear cover such that the first spring end is pressed against the spring seat of the rear cover;
- a seal, being located in the rear cover and arranged such that the second spring end is pressed against the seal, wherein when fuel pressure in the housing is no greater than a spring preload, the seal is pressed tightly against the connecting end of the housing and closes the fuel channel; and
- a fixing ring, arranged in relation to the rear cover so as to fix the rear cover to the connecting end of the housing, the fixing ring being welded by laser to the connecting end, wherein:
- the connecting end of the housing has an end wall, a sealing part protruding from the end wall, and a welding part;
- the fuel channel runs through the sealing part, the opening end of the rear cover being arranged outside the sealing part, and the opening end of the rear cover having an outwardly bent part; and
- the fixing ring is arranged outside the rear cover and presses against the outwardly bent part, and the fixing ring is connected by laser welding to the welding part.

5. The fuel pressure regulator and fuel filter assembly as claimed in claim 4, wherein:
- the welding part is arranged around the outside of the sealing part and is separated from the sealing part by a gap, and the fixing ring has an inner ring part and an outer ring part spaced apart from one another;
- the inner ring part and the opening end of the rear cover are located between the sealing part and the welding part; and
- the welding part is located between the inner ring part and the outer ring part, and is welded by laser to the outer ring part.

6. The fuel pressure regulator and fuel filter assembly as claimed in claim 4, wherein:
- the sealing part has a sealing face; and
- in a case in which fuel pressure in the housing is no greater than the spring preload, the seal is pressed tightly against the sealing face, thereby closing the fuel channel.

7. The fuel pressure regulator and fuel filter assembly as claimed in claim 4, wherein the seal is made of fluororubber, with a metal framework injection molded therein.

8. The fuel pressure regulator and fuel filter assembly as claimed in claim 4, further comprising a grounding bolt and a grounding spring arranged in the cover plate.

* * * * *